United States Patent [19]
Matumoto et al.

[11] 3,906,723
[45] Sept. 23, 1975

[54] EXHAUST GAS PURIFYING SYSTEM

[75] Inventors: Noboru Matumoto; Takao Nonoyama, both of Toyota; Tutomu Tomita, Okazaki; Yukio Suzuki, Toyota, all of Japan

[73] Assignee: Toyota Jidosha Kogyo Kabushiki Kaisha, Japan

[22] Filed: Aug. 23, 1974

[21] Appl. No.: 499,841

[30] Foreign Application Priority Data
Mar. 8, 1974 Japan.............................. 49-26154
Mar. 8, 1974 Japan.............................. 49-26155

[52] U.S. Cl................................... 60/290; 60/306
[51] Int. Cl.²...................... F02B 75/10; F01N 3/14
[58] Field of Search.............. 60/289, 290, 306, 286

[56] References Cited
UNITED STATES PATENTS

| 3,360,927 | 1/1968 | Cornelius | 60/289 |
| 3,733,829 | 5/1973 | Henault | 60/289 |
| 3,802,194 | 4/1974 | Tanasawa | 60/286 |
| 3,826,089 | 7/1974 | Nakajima | 60/290 |

*Primary Examiner*—Douglas Hart
*Attorney, Agent, or Firm*—Kane, Dalsimer, Kane, Sullivan and Kurucz

[57] ABSTRACT

An exhaust gas purifying system for use in an internal combustion engine includes an air switching device connected to an air cleaner and operated by negative pressure introduced from a suction pipe. The air switching device selectively supplies the air from the air cleaner to an exhaust manifold for oxidation of unburnt gas components or to a catalyst convertor for cooling catalyst, or otherwise returns the air to the air cleaner, when not required, commensurate to the running condition of a vehicle.

10 Claims, 3 Drawing Figures

EXHAUST GAS PURIFYING SYSTEM

BACKGROUND OF THE INVENTION

1. Field of the invention

This invention relates to an exhaust gas purifying system for use in an internal combustion engine, and more particularly to the improvements of an exhaust gas purifying system of the type described, which includes an air injection device and a catalyst convertor for reacting unburnt gases from an internal combustion engine.

2. Description of the prior art

Exhaust gas test under the running conditions specified in U.S. 10 or 11 mode is known for measuring the quantity of harmful unburnt gas components contained in the exhaust gases from an automobile engine which is typical of internal combustion engines. According to said test, a car is driven for idling, accelerating, decelerating running conditions specified in said mode, before and after an engine warm-up operations, whereby the quantity of unburnt gas components contained in the exhaust gas from an engine during the running of a car is measured and tested for its allowance.

For reducing to below said allowance the quantity of unburnt gases from an automobile engine, i.e., as a device as a countermeasure for treating exhaust gases, there have been proposed (i) a throttle positioner adapted to preclude the possible rapid shifting of a throttle valve from its open position to its closed position, said throttle valve being provided in a suction pipe adapted to feed a mixture gas to an engine, at the start of a decelerating running, (ii) an air injection device for injecting the air from an air cleaner into an exhaust manifold of an engine, and (iii) a catalyst convertor.

The throttle positioner precludes rapid or abrupt reduction in the quantity of mixture gas to be fed to a cylinder of an engine by preventing the rapid reduction in opening angle of a throttle valve, at the start of a decelerating running of a car. This prevents reduction in the compression ratio of a mixture gas within a cylinder as well as avoids a misfire due to said reduction in compression ratio, thereby reducing the quantity of unburnt gases exhausted from a cylinder.

The aforesaid air injection device oxidizes unburnt gas components exhausted from a cylinder into an exhaust manifold, with air being injected through said injection device therein to thereby reduce the quantity of unburnt gas components contained in exhaust gases.

The catalyst convertor accelerates the reaction of unburnt gases contained in exhaust gases but fed from said exhaust manifold to purify or convert exhaust gases, while reducing the quantity of unburnt gases from an engine.

Nevertheless, air injection into an exhaust manifold by means of said air injection device should be avoided at the time of starting deceleration and the running other than those specified in said mode, in the interest of the driving performance and safety as well as for the sake of protection of said catalyst convertor. More particularly, air injection into an exhaust manifold should be avoided for precluding the afterfire at the time of said deceleration which likely causes a misfire of an engine, particularly at the time of starting deceleration of a car which is most apt to cause a misfire. Another reason for this is that, overheating of a catalyst converter due to high temperature exhaust gases containing unburnt gas components therein as well as deterioration of catalyst accruing therefrom should be avoided at the time of a high speed running which dictates a high R.P.M. for an engine, at the time of the running when a throttle valve is opened fully, with the accompanying high load exerted on an engine, or at the time of the use of an engine brake for a long period of time.

To this end, it has been a practice that an air switching device provided in air supply pipe and an air feed back pipe which is adapted to return air to an air cleaner, when not required, and connects the air switching device to the air cleaner are provided for a conventional exhaust gas purifying system, which is provided with an air cleaner, a suction pipe, a throttle valve adapted to be actuated in association with a throttle positioner and disposed in a suction pipe, an exhaust manifold connected to discharge ports of an engine, a catalyst convertor connected to the exhaust manifold, and an air supply pipe connecting the air cleaner to the exhaust manifold for air injection. The aforesaid switching device functions so as to supply the air from an air cleaner to said exhaust manifold depending on the running conditions of a car but according to a signal from a computor which collects and analyzes the information of running conditions from a car-speed sensor and the like, or to return air through an air feed back pipe to an air cleaner.

This leads to the use of a complicated and hence costly exhaust gas purifying system, because said switching device has a computor assembled therein.

Another disadvantage of the prior art system is the likelihood of overheating in a catalyst convertor at the time of an engine brake running for a long period of time, which overheating is one of the causes for car fires and deterioration of catalyst and is caused by increasing vigorous reaction within a catalyst convertor due to the increase in the quantity of unburnt gases contained in exhaust gases.

It is accordingly an object of the present invention to provide an exhaust gas purifying system which is simple in construction.

It is another object of the present invention to provide an exhaust gas purifying system having an air switching device which dispenses with the control of an computor.

It is a further object of the present invention to provide an exhaust gas purifying system having a catalyst convertor which is free of deterioration of catalyst, even in the case of an engine brake running for a long period of time.

According to the present invention, there is provided an exhaust gas purifying system for use in an internal combustion engine, said system including an air cleaner, a suction pipe, a throttle valve provided in the suction pipe and an exhaust manifold, the improvements thereof comprising: a throttle positioner for controlling the closing speed of a throttle valve; a catalyst convertor connected to the exhaust manifold; an air switching device provided with first and second valves; an air supply pipe connecting the air cleaner to the air switching device; an air feed back pipe for feeding the air from the air cleaner back to the air cleaner through the first valve; a pipe for supplying the air from the air cleaner to the exhaust manifold through the first and second valves; and a pipe for supplying the air from the air cleaner to the catalyst convertor through the first and second valves.

The exhaust gas purifying system according to the present invention features that, at the time of an engine brake running of a car for a long period of time, the air from an air cleaner is supplied to a catalyst convertor for cooling same to thereby prevent the deterioration of catalyst due to overheating in said convertor. Another feature of the system of the present invention is in that, based on the fact that there prevails a considerable difference between negative pressures prevailing on the upstream side of a throttle valve, i.e., on the side of the air cleaner within a suction pipe and on the downstream side thereof, i.e., on the side of an engine within the suction pipe and that the opening angle of the throttle valve substantially depends on the running condition of an automobile ports are provided in the wall of the suction pipe, whereby due to the large negative pressure variation prevailing in the vicinity of said ports, which variation depends on the variation in opening angle of the throttle valve, first and second valves in a switching valve are actuated to supply the air from a cleaner to an exhaust manifold for air injection therein or to a catalyst convertor for cooling same, commensuarate to the running conditions of an automobile, while the air from the air cleaner may be fed back to the air cleaner, when not required, without the aid of a computor.

These and other objects and features of the present invention will be apparent from a reading of the ensuing part of the specification in conjunction with the accompanying drawings which indicate the preferred embodiments of the present invention.

DETAILED DESCRIPTION OF THE PREFERRED EMBODIMENTS

Figure 1:
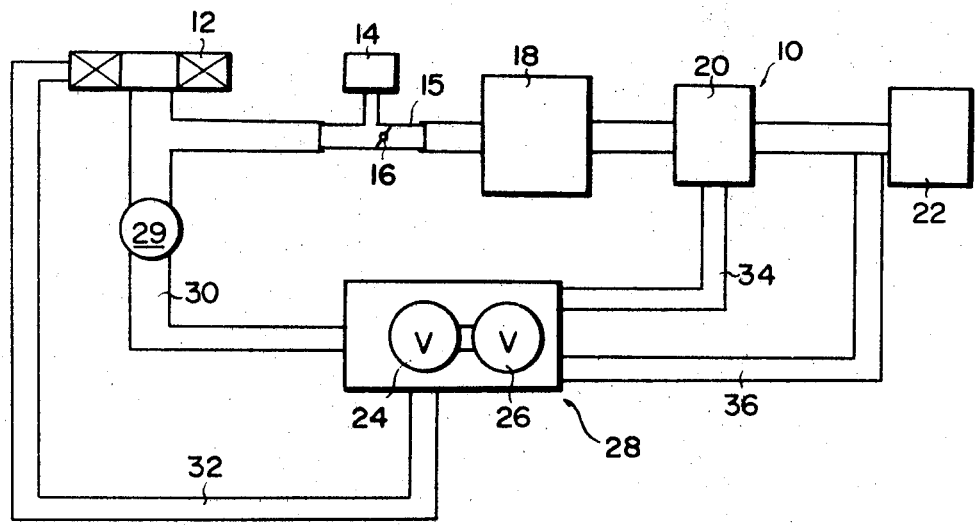
FIG. 1 is a block diagram illustrating an exhaust gas purifying system according to the present invention.

FIG. 1 shows a block diagram of an exhaust gas purifying system 10 according to the present invention. The system 10 includes an engine 18, to which is fed a mixture gas of air from an air cleaner 12 and fuel from a tank 14 through a throttle valve 16 provided in a suction pipe 15; an exhaust manifold 20 connected to the engine; a catalyst convertor 22 connected to the exhaust manifold 20; an air switching device 28 provided with first and second valves 24, 26; and air pipe 30 for feeding the air from the air cleaner 12 to the air switching device 28 by means of an air pump 29; an air feed back pipe 32 for returning the air, which has been fed through said pipe 30, to the air cleaner 12; and air supply pipes 34, 36 for feeding the air, which has been fed through said air pipe 30 by means of the air pump 29, to the exhaust manifold 20 as well as to the catalyst convertor 22 by way of the first and second valve 24, 26.

Figure 2:
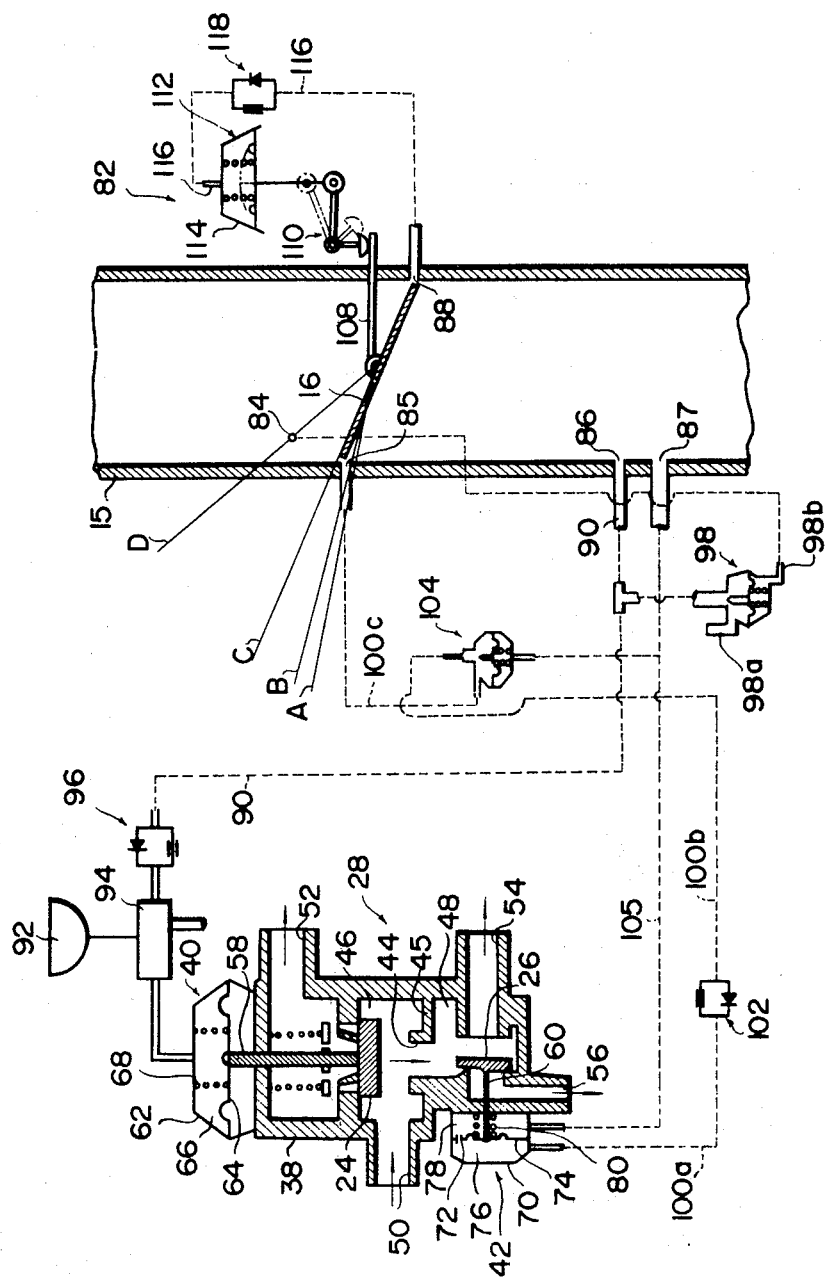
FIG. 2 is a longitudinal cross-sectional view showing an air switching device and a suction pipe connected to said device in the system shown in FIG. 1.

As shown in FIG. 2, the air switching device 28 comprises a casing 38, and first and second diaphragm mechanisms 40, 42 adapted to operate the valves 24, 26 which are provided in said casing 38, respectively.

The casing 38 is provided with first and second partitioned chambers 46, 48 having a partition wall 45 therebetween which divides said first and second chambers in a communicating relation with each other through an opening 44 provided in the wall 45.

The first partitioned chamber 46 is provided with a first opening 50 communicating with the air supply pipe 30 and a second opening 52 communicating with the air feed back pipe 32. The second partitioned chamber 48 is provided with a third opening 54 communicating with the air supply pipe 34 for feeding air to the exhaust manifold 20 and a fourth opening 56 communicating with the air supply pipe 36 for feeding air to the catalyst convertor 22.

The first valve 24 is provided within the first partitioned chamber 46 and adapted to selectively open or close the opening 44 provided in the partition wall 45 of the casing 38 as well as the second opening 52 communicating with the air feed back pipe 34. The valve 24 is connected through the medium of a stem 58 to the first diaphragm mechanism 40. On the other hand, the second valve 26 is provided within the second partitioned chamber 48 and adapted to selectively open or close the third opening 54 communicating with the air supply pipe 34 as well as the fourth opening 56 communicating with the air supply pipe 36, being connected through the medium of a stem 60 to the second diaphragm mechanism 42.

The first diaphragm mechanism 40 is provided with a casing 62, a diaphragm 64 and a spring 68 which functions so as to cause the first valve 24 to normally close the opening 44 and is disposed within a diaphragm chamber 66 defined by the diaphragm 64 and the casing 62, while a stem 58 is connected to the diaphragm 64 of the mechanism 40.

The second diaphragm mechanism 42 is provided with a casing 70, a diaphragm 74 having an orifice 72 therein acting as an air resisting element, first and second diaphragm chambers 76 and 78 defined on the opposite sides of the diaphragm 74 and a spring 80 acting so as to cause the second valve 26 to normally close the opening 56, while the stem 60 is connected to diaphragm 74.

The diaphragm chambers 66, 76 and 78 of the first and second diaphragm mechanisms 40 and 42 are connected to the suction pipe 15, in which is provided with a throttle positioner 82 and said throttle valve 16 which operates in association with an accelerator pedal (not shown).

There are provided ports 84, 85, 86, 87 and 88 in the suction pipe 15. The port 84 is located upstream of the attaching position of the throttle valve 16 but at an opening angle of the throttle valve assumed when the normal running of a vehicle is shifted to a high speed running which requires to stop feeding air to an exhaust manifold from viewpoint of protection of a catalyst convertor. More particularly, the port 84 in general is located at an opening angle of the throttle valve which is positioned between specified mode running and the running other than those covered under said specified mode. The port 85 is located between the throttle opening position of the throttle valve 16 which is determined by the throttle positioner 82 and shown by a line C and the opening position shown by a line B, of the throttle valve 16 at idling, while the ports 86, 87 are located downstream of the throttle valve. On the other hand, the port 88 is provided in the throttle opening position shown by the line C of the throttle valve 16. The diaphragm chamber 66 of the first diaphragm mechanism 40 is in communication with the port 86 by means of a pipe 90. Provided in the pipe 90 are a protective air switching device 94 adapted to communicate the pipe 90 with atmosphere at a dangerously high temperature, by means of a thermostat 92 adapted to detect the water temperature or the like, and a delay valve 96 adapted to impart resistance only to the air flow from diaphragm chamber 66 to the port 86. Provided for pipe 90 is a diaphragm mechanism 98 communicating with the port 84, while the diaphragm mechanism 98 is provided with a diaphragm chamber communicating with atmosphere through a pipe 98*a* and a pipe 98*b* communicating with the opening 84. The aforesaid pipe 90 is blocked from communication with atmosphere by means of diaphragm mechanism 98, normally.

The first diaphragm chamber 76 of the second diaphragm mechanism 42 is communicated by means of pipes 100*a*, 100*b*, 100*c* with the port 85 provided in the suction pipe 15. Provided between pipes 100*a* and 100*b* and between pipes 100*b* and 100*c* are a delay valve 102 which imparts resistance to air flow running to the right as viewed in the drawing and a diaphragm mechanism 104 adapted to open passage for a piping at a negative pressure of −525 mmHg ± 25 mmHg. In addition, the second diaphragm chamber 78 is communicated with the port 87 provided on the downstream side of the suction pipe 15, i.e., on the side of an engine.

The throttle positioner 82 which controls rapid closing of throttle valve 16 is provided with an arm 108 provided on the throttle valve 16, a link member 110 engaging the arm 108, and a diaphragm mechanism 112 adapted to operate at a negative pressure of −250 to −300 mmHg, while a diaphragm chamber 114 of the mechanism 112 communicates through a pipe 116 with the port 88. Provided on the pipe 116 is a delay valve 118 which imparts resistance only to the air flowing from the diaphragm chamber 114 to the port 88.

At the time of idling in said specified mode running, the throttle valve 16 is in the idling position shown by the line B which is at an angle of about 3° to a full closed position shown by a line A, of the throttle valve, so that there prevails a negative pressure on the order of −430 mmHg in the neighborhood of the ports 86, 87 and 88 which are downstream of said idling position of the valve 16, because the valve 16 throttles the effective bore of the suction pipe, while there prevails an atmospheric pressure in the vicinity of the ports 84 and 85 upstream of the said idling position of the valve 16, such that atmospheric pressure through the port 84 will cause the diaphragm mechanism 98 to interrupt communication of the pipe 90 with atmosphere. As a result, the diaphragm mechanism 112 of the throttle positioner 82 will be operated so as to maintain the link member 110 on a two point chain line, while the negative pressure prevailing in the vicinity of the port 86 will operate the first diaphragm mechanism 40, such that the first valve 24 will close the opening 52. On the other hand, the first diaphragm chamber 76 of the second diaphragm mechanism 42 will be interrupted from communication with atmosphere due to the diaphragm mechanism 104 closing the pipe 100*c*, such that a negative pressure will be introduced into the second diaphragm chamber 78 through the port 87. However, since the difference between said first and second negative pressures, introduced into said first and second diaphragm chambers 76, 78, respectively, is less, negative pressure prevailing in the both chambers will soon be equalized by means of an orifice 72, the second valve will be maintained in a position closing the fourth opening 56. As a result, air which has been fed from the cleaner 12 through the air supply pipe 30, then through the first opening 50 of the switching device 28 into the first partitioned chamber 46 is fed through the opening 44 into the second partitioned chamber 48 and then through the opening 54 through air supply pipe 34 to the exhaust manifold 20 for air injection therein.

At the time of accelerating and normal running in said specified mode running, the throttle valve 16 is positioned between said throttle opening position as shown by the line C which is at an angle of about 11° to said idling position and the opening position of the throttle valve, shown by a line D, on which is positioned the port 84. For this reason, the port 85 positioned between the idling position and said throttle opening position shown by the line C will be positioned downstream of the throttle valve 16 in a relative sense, like the ports 86 and 87, so that a negative pressure as low as −350 mmHg will act on the ports 85, 86 and 87, because the effective bore of the suction pipe 15 is increased as compared with that at the time of idling. The port 88 provided in said throttle opening position shown by the line C is positioned upstream of the opening position of throttle valve 16 between the lines C and D, so that the atmospheric pressure will act on the port 88, whereby diaphragm mechanism 112 will return the link member 98 to a position shown by the solid line in the drawing. The first diaphragm 40, like in the case of idling, maintains the first valve in a position closing the second opening 52 due to a negative pressure prevailing in the vicinity of the port 86. On the other hand, the first diaphragm chamber 76 is interrupted from communication with the port 85 by means of the diaphragm 104 as at the time of idling, while there is prevailing a weak negative pressure through port 87 within the second diaphragm chamber 78. In this respect, like the case with idling, said both chambers 76, 78 will be equalized under the action of the orifice 72, so that the first diaphragm 42 will maintain the valve 26 in a position closing the third opening 56. As a result, in the accelerating and normal running in the specified mode, said exhaust manifold 20 will be fed with air, like the case with idling.

In the case of the decelerating running in the aforesaid specified mode, i.e., a decelerating running for a short time, the release of an accelrator pedal tends to shift the throttle valve 16 from its opening position at the time of accelerating and normal running to its idling position as shown by the line B, although throttle valve 16 will be stopped in the throttle opening position as shown by the line C by means of link member 110 of the throttle positioner 82. The shifting of the throttle valve 16 to the throttle opening position C will reduce the effective bore of the suction pipe, so that a negative pressure at about −525 mmHg will prevail in the vicinity of ports 85, 86 and 88 which are positioned downstream of the throttle valve 16, while atmospheric pressure acts on the port 84 which is upstream of the throttle valve 16. The atmospheric pressure at the port 84 will maintain the diaphragm 98 so as not to operate, while a negative pressure prevailing in the vicinity of the port 86 will be introduced into the diaphragm chamber 66, so that the first diaphragm mechanism 40 will maintain the first valve in a position closing the second opening 52, like in the case with the accelerating and normal running conditions. On the other hand, a negative pressure at the port 87 will be introduced into the second diaphragm chamber 78 of the second diaphragm mechanism 42, while the diaphragm 104 will be actuated, thereby bringing pipe 100b in communication with the pipe 100c. However, in said accelerating and normal running, a negative pressure of about −350 mmHg has been introduced into the first diaphragm chamber 76 and pipes 100a to 100c. Thus, even if a negative pressure at as high as about −525 mmHg is introduced through port 85 into pipes 100b and 100c, the first diaphragm chamber 76 will be maintained at a negative pressure of about −350 mmHg by means of orifice 72 and delay valve 102 which imparts resistance to the air flowing to the right as viewed in the drawing. As a result, the equilibrium between the negative pressures in the first diaphragm chamber 76 and the second diaphragm chamber 78 will be lost, so that the second diaphragm mechanism 42 will shift the second valve 26 to a position closing the third opening 54. The difference in negative pressure between said first and second diaphragm chambers 76, 78 will be eliminated after a lapse of a given time, due to the fact that air within the first diaphragm chamber 76 is fed through orifice 72 provided in the diaphragm 74 to the second diaphragm chamber 78, whereby the second diaphragm mechanism 42 will return the valve 26 from the position closing the third opening 54 to the position closing the fourth opening 56.

Meanwhile, due to increase in a negative pressure prevailing in the vicinity of the port 88, air within the diaphragm chamber 114 of the diaphragm mechanism 112 will be gradually discharged through the port 88 into the suction pipe 15, while being subjected to the resistance by means of the delay valve 118. As a result, after a lapse of a given time, the diaphragm mechanism 112 will begin shifting the link member 110 from the position shown by the solid line in the drawing to a position shown by the broken line.

Accordingly, at the time of the starting a decelerating running in said specified mode, abrupt decrease in the quantity of a mixture gas introduced under suction which is likely to be caused at the time of deceleration as well as a misfire due to shortage in the compression ratio of a mixture gas may be both prevented by maintaining throttle valve 16 at the opening position shown by the line C, of the throttle valve 16 due to the operation of throttle positioner 82. On the other hand, due to the operation of the first and second diaphragm mechanisms 40 and 42, the air which has been introduced through the first opening 50 to the first partitioned chamber 46 is fed, at the starting time of deceleration, through the partition wall opening 44 into the second partitioned chamber 48, then through the fourth opening 56 to the catalyst convertor for cooling same. Then, the air which has been introduced into the second partitioned chamber 48 is fed through the third opening 54 to the exhaust manifold 20, after a lapse of a given time.

In the deceleration running out of said specified mode, i.e., the decelerating running for a long period of time, the link member 110 of the throttle positioner 82 is shifted to the position shown by the two point chain line. As a result, the throttle valve 16 will be shifted from its opening position shown by the line C, of throttle to the idling position shown by the line B. Due to the rotation of the valve 16, the relative position of the port 85 will be upstream of the valve 16, as in the case with the port 84, while the ports 86, 87 and 88 will be positioned downstream of the valve 16 as in the case with the initial phase of said decelerating running. Accordingly, the link member 110 of the throttle positioner 82, the first diaphragm mechanism 40 and the diaphragm mechanism 104 will be operated in the aforesaid manner. However, the air through the port 85 will be fed by way of the delay valve to the first diaphragm chamber 76, due to the port 85 being communicated with atmosphere. Meanwhile, a negative pressure of −525 mmHg acts on the port 87, with said negative pressure being introduced into the second diaphragm chamber 78. This results in a considerable difference in the negative pressures between the first and second diaphragm chambers 76 and 78, so that there is no possibility that a negative pressure in the both diaphragm chambers 76 and 78 reaches equilibrium. As a result, the second diaphragm mechanism 42 will maintain the valve 26 in a position closing the third opening 54. Thus, in the decelerating running for a long period of time, the air from the air cleaner 12 will be fed through the partition wall opening 44 and the second partitioned chamber 48 and then through the fourth opening 56 to the catalyst convertor 22 for cooling same.

In a throttle full open, accelerating and high speed running other than those in the specified mode, the opening angle of the throttle valve which is in alignment with the port 84. As a result, the relative position of the port 84 will be downstream of the opening position of throttle valve 16, with the result of introduction of a negative pressure into the port 84 to act on diaphragm 98. The introduction of a negative pressure will cause the diaphragm 98 to bring the pipe 90 in communication with atmosphere to provide an atmospheric pressure to the diaphragm chamber 66. As a result, the first diaphragm mechanism 40 will shift the first valve 24 from a position closing the second opening 52 to a position closing said partition wall opening 44. It follows that the air which has been fed from the air cleaner 12 through the opening 50 to the first partitioned chamber 46 will be fed back through the second opening 52 into the air cleaner 12, rather than being fed to the second partitioned chamber 48.

Figure 3:
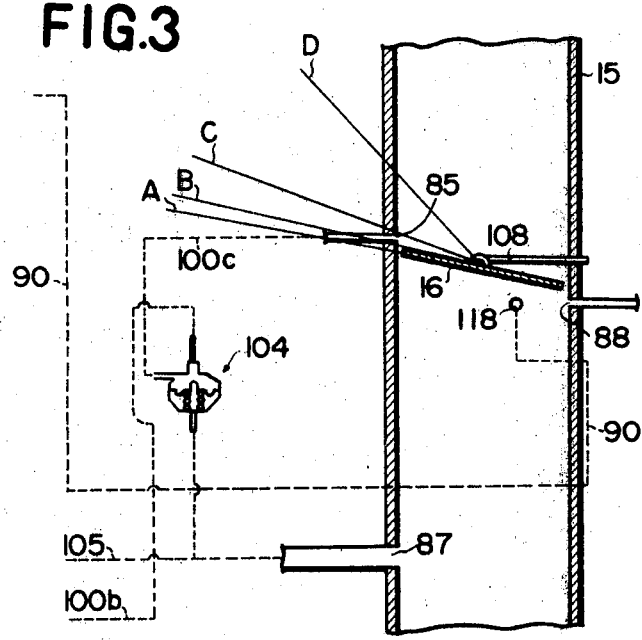
FIG. 3 is a longitudinal cross-sectional view showing part of a suction pipe which is connected to the air switching device as well as to the suction pipe shown in FIG. 2, presenting a modification of the connecting relation thereof.

As shown in FIG. 3, the pipe 90 connected to the first diaphragm chamber 66 may be positioned downstream of the attaching position of throttle valve 16 so as to communicate with the port 118 positioned in the specified throttle opening position shown by the line C of the throttle valve, which is on the border between said specified mode running and an out-of mode running. The communication of the pipe 90 with the port 118 dispenses with the provision of diaphragm 98 for releasing the negative pressure within pipe 90. In cases other than the throttle full open running, accelerating and high speed running in the out-of specified mode, the opening angle of throttle valve 16 is maintained below the angle of a throttle which is in alignment with the port 118, with a negative pressure acting on the port 118. As a result, the first diaphragm mechanism 40 maintains the first valve in a position closing the second opening 52 all the times, whereby the air which has been fed from the air cleaner 12 through the first opening to the first partitioned chamber 46 will be fed through the opening 44 to the second partitioned chamber 48 for supplying air to the exhaust manifold 20 and the catalyst convertor 22. Meanwhile, in the throttle full open running, accelerating and high speed running in the said out-of specified mode, the relative position of the port 118 will be downstream of the opening position of throttle valve 16, so that a negative pressure will be introduced through port 118, whereby the first diaphragm mechanism 40 will shift the first valve 24 to a position closing the partition wall opening 44. Accordingly, as has been described by referring to FIG. 2, the air from the air cleaner 12, in said out-of specified mode, will be returned through the feed back pipe connected to the second opening to the air cleaner 12.

The opening position of the throttle valve which governs the relative positions of ports 84, 118 is dependent on the level, to which the catalyst convertor is likely to be overheated, as well as on the construction of an engine.

In general, the opening position of the throttle valve may be in an angular range from about 30 degrees to 40 degrees to the throttle opening position C.

As is clear from the foregoing description, the feed of air to the exhaust manifold for air injection and the feed of air to the catalyst convertor for cooling same may be controlled commensurate to the running conditions of an automobile, without the use of a computor, and furthermore even in the engine brake running for a long period of time, the deterioration of catalyst due to overheating of the catalyst convertor may be prevented, while successfully reducing the quantity of harmful gases contained in exhaust gases from an engine to below the specified values of the aforesaid 10 or 11 mode.

It will be understood that the above description is merely illustrative of preferred embodiments of the invention. Additional modifications and improvements utilizing the principle of the present invention can be readily anticipated by those skilled in the art from the present disclosure, and such modifications and improvements may fairly be presumed to be within the scope and purview of the invention as defined by the claims that follow.

What is claimed is:

1. In an exhaust gas purifying system for use in an internal combustion engine, wherein there are provided an air cleaner, a suction pipe, a throttle valve provided in said suction pipe, a throttle positioner for controlling said throttle valve, an exhaust manifold and a catalyst convertor, the improvements comprising:
   an air switching device provided with a first and second valves;
   an air supply pipe for connecting said air switching device to said air cleaner;
   a first pipe for feeding air from said air cleaner to said exhaust manifold through said first and second valves;
   a second pipe for feeding air from said air cleaner through said first and second valves to said catalyst convertor;
   means for actuating said first valve due to a negative pressure which has been introduced therein through a port provided in said suction pipe but in a position in the vicinity of the attaching position of said throttle valve within said suction pipe; and
   means for actuating said second valve which normally closes said second pipe due to the difference between the negative pressure which has been introduced through a port positioned between the throttle opening position of said throttle valve and the idling position, and the negative pressure on the downstream side of the throttle valve within said suction pipe.

2. An exhaust gas purifying system for use in an internal combustion engine as set forth in claim 1, wherein said air switching device includes a casing provided with first and second partitioned chambers which are divided by a partition wall having an opening therein in a communicating relation with each other, said first partitioned chamber being provided with a first opening communicating with said air supply pipe and a second opening communicating with an air feed back pipe, said second partitioned chamber being provided with a third opening communicating with said exhaust manifold and a fourth opening communicating with said catalyst convertor, said first valve being disposed within said first partitioned chamber for selectively opening and closing the said second opening as well as said opening provided in said partition wall, and said second valve being disposed within said second partitioned chamber for selectively opening and closing said third and fourth openings.

3. An exhaust gas purifying system for use in an internal combustion engine as set forth in claim 1, wherein means for actuating said first valve consists of a diaphragm mechanism, which is provided with a diaphragm chamber communicating with a port provided in said suction pipe on the downstream side of the throttle valve but in the vicinity of the throttle valve attaching position in said suction pipe.

4. An exhaust gas purifying system for use in an internal combustion engine as set forth in claim 1, wherein means for actuating said second valve consists of a diaphragm mechanism which is provided with first and second diaphragm chambers which are in communication with each other through a resisting element and defined on the opposite sides of a diaphragm, said resisting element being provided in said diaphragm, said first diaphragm chamber being in communication through a one-way delay element and a valve with a port provided in said suction pipe but in a position between said throttle opening position of the throttle valve and said idling position thereof, and said second diaphragm chamber being in communication with the downstream side of the throttle valve within said suction pipe.

5. An exhaust gas purifying system for use in an internal combustion engine as set forth in claim 4, wherein said resisting element is an orifice and said one-way delay element is a delay valve.

6. In an exhaust gas purifying system for use in an internal combustion engine, wherein there is provided an air cleaner, a suction pipe and a throttle valve provided within said suction pipe, a throttle positioner for controlling opening and closing of said throttle valve, an exhaust manifold and a catalyst convertor, the improvements comprising:
   an air switching device provided with first and second valves;
   an air supply pipe for connecting said air switching device to said air cleaner;

a pipe for feeding back air from said air cleaner through said first valve to said air cleaner;

a pipe for feeding the air from said air cleaner through said first and second valves to said exhaust manifold;

a pipe for feeding the air from said air cleaner through said first and second valves to said catalyst convertor;

means for actuating said first valve due to the negative pressure on the downstream side of the throttle valve within said suction pipe, in which the air supply is controlled by means which is operable due to the negative pressure fed through a port provided in said suction pipe on the upstream side of the throttle valve but in the vicinity of said throttle valve attaching position; and means for actuating said second valve which normally closes said pipe for feeding the air from said air cleaner to said catalyst convertor therethrough, due to the difference between the negative pressure which has been introduced through a port positioned between the throttle opening position of said throttle valve, and an idling position, and the negative pressure on the downstream side of the throttle valve within said suction pipe.

7. An exhaust gas purifying system for use in an internal combustion engine as set forth in claim 6, wherein said air switching device includes a casing provided with first and second partitioned chambers which are divided by a partition wall having an opening therein in a communicating relation with each other, said first partitioned chamber is provided with a first opening communicating with said air supply pipe and a second opening communicating with said air feed back pipe, said second partitioned chamber being provided with a third opening communicating with said exhaust manifold and a fourth opening communicating with said catalyst convertor, said first valve being disposed within said first partitioned chamber for selectively opening and closing said second opening as well as said opening provided in said partition wall, and said second valve being disposed within said second partitioned chamber for selectively opening and closing said third and fourth openings.

8. An exhaust gas purifying system for use in an internal combustion engine as set forth in claim 6, wherein means for actuating said first valve consists of a diaphragm mechanism which is provided with a diaphragm chamber, to which is fed the negative pressure on the downstream side of the throttle valve within said suction pipe, the feed of air to said suction pipe being controlled by means which is operable due to the negative pressure which has been introduced through a port in said suction pipe on the upstream side of the throttle valve but in the vicinity of said throttle attaching position within said suction pipe.

9. An exhaust gas purifying system for use in an internal combustion engine as set forth in claim 6, wherein means for actuating said second valve consists of a diaphragm mechanism which is provided with first and second diaphragm chambers which are in communication with each other through a resisting element and defined on the opposite sides of a diaphragm, said resisting element being provided in said diaphragm, said first diaphragm chamber being in communication through a one-way delay element and a valve with a port provided in said suction pipe in a position between the throttle opening position of said throttle valve and the idling position thereof, and said second diaphragm chamber being in communication with the downstream side of the throttle valve within said suction pipe.

10. An exhaust gas purifying system for use in an internal combustion engine as set forth in claim 9, wherein said resisting element is an orifice and said one-way delay element is a delay valve.

* * * * *